United States Patent Office 2,946,943
Patented July 26, 1960

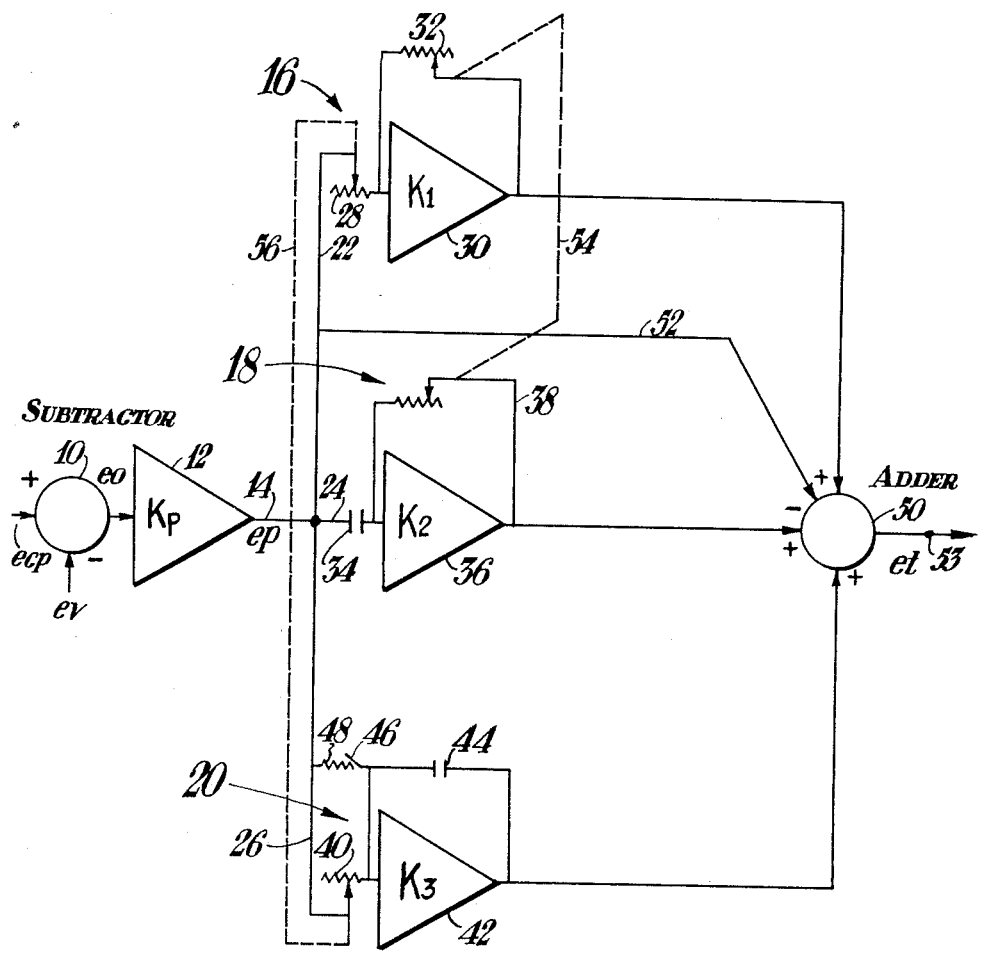

2,946,943
PARALLEL COMPONENT CONTROLLER SERVOSYSTEM

Dudley D. Nye, Jenkintown, Pa., and Ronald Y. Paradise, Passaic, N.J., assignors to Robertshaw-Fulton Controls Company, Richmond, Va., a corporation of Delaware Filed Feb. 20, 1956, Ser. No. 566,692

14 Claims. (Cl. 318—448)

This invention relates to control devices and more particularly to parallel component arrangements for automatically controlling processes and the like.

Most conventional process controllers approximate or approach the action of a cascaded controller, that is, a controller with the proportional, derivative, and integral sections or components connected in cascade and with the process error signal being fed to the first component in the cascade. There are many inherent disadvantages present in the cascaded controller and, most notable is the limitation in the available composite control actions since the factored form of the cascade controller transfer function has only real number coefficients. It is generally known that controller transfer functions with complex number coefficients will produce control effects if the process also has complex number coefficients in its factored transfer function wherein inductance, inertia and the like are present in combination with capacitance. In recent years it has been found that in some cases superior control can be obtained with the complex number controller even though the process transfer function does not contain complex coefficients.

Another inherent disadvantage of the cascade controller is the effect of the output of the controller in the event that one of the response circuits becomes saturated, that is, when the input to the component reaches such a value that the output no longer experiences a change required by the component. In the event of a saturated component, the output of that component is not longer representative of the input thereof and the control of the output within the next component is retarded so that the output of the controller itself is ineffective to control the process in accordance with the corrective medium.

The present invention provides a controller system which may be considered as electronic, hydraulic or mechanical wherein the proportional, derivative, and integral response components are connected in parallel, that is, the inputs of the response circuits are connected together and their outputs are added. Restriction ganging is provided between various restrictors in the response components resulting in a controller having adjustability identical to that of the cascade system. In addition, means is provided for modifying a control component for obtaining a logical method for producing and adjusting complex number coefficients in the factored transfer function of the controller. Therefore it is the principal object of this invention to produce a controller that has the adjustability of a cascaded controller, when cascade characteristics are desired, and to obtain characteristics not available to the cascaded system with a logical method of adjustment.

Another object of the invention is to prevent the complete shut-down of the control of a process in the event that one of the response circuits becomes inoperative.

Another object of the invention is to insure against loss of control of a process in the event that one of the response components becomes saturated.

Other objects and advantages will become apparent from the following specification taken in conjunction with the accompanying drawing wherein the single figure shows a block diagram illustrating the principle of operation of this invention.

Referring to the drawing there is shown a block diagram illustrating a controller embodying the principle of the present invention. The basic system illustrated in the drawing involves the application of a control point signal $e_{cp}$ to a subtractor 10 wherein the signal $e_{cp}$ is reduced by the subtraction of the controlled variable signal $e_v$ which is proportional to the controlled variable such as temperature, pressure, flow and the like, resulting in an error signal $e_0$. The error signal $e_0$ is amplified by an amplifier 12 having a negative gain of $K_p$, that is, the output decreases when the input increases and the amplified signal is fed to a parallel amplifier system to be modified by various response components as will presently appear.

The output of amplifier 12 is connected by a conductor 14 through three branches generally indicated by the reference numerals 16, 18 and 20 of the parallel system by conductors 22, 24, and 26, respectively. The branch 16 comprises a variable resistor 28 having one end connected to the conductor 22 and the other end to the input of a negative gain amplifier 30. A variable resistor 32 is connected between the input and the output of the amplifier 30 and thus provision is had for applying the error signal $e_0$ to a proportional response component comprising the resistors 28, 32 and the amplifier 30.

The branch 18 includes a capacitor 34 having one end connected to the conductor 14 and the other end connected to a negative gain amplifier 36. A variable resistor 38 is connected to the input and output of the amplifier 36 and the combination of the capacitor 34, the resistor 38 and the amplifier 36 is adapted to produce an output signal in proportion to the derivative of the error signal $e_0$.

The branch 20 comprises a variable resistor 40 connected at one end to the conductor 26 and at the other end to a negative gain amplifier 42. A capacitor 44 is connected across the input and output of the amplifier 42. The branch 20 serves to produce an output signal proportional to the integral of the error signal $e_0$. A switch 46 and a resistor 48 are connected in series between the input side of the capacitor 44 and the conductor 26 for a purpose which will be described more fully hereinafter.

As shown in the drawing, each of the amplifiers 30, 36 and 42 are connected to an adder circuit 50 having at least four inputs, one for each of the amplifiers 30, 36 and 42 and for a conductor 52 connected directly to the output of the amplifier 12 by way of the conductors 14 and 22. The output signal $e_t$ appearing at a terminal 53 of the adder circuit 50 is adapted to be used for controlling purposes. This signal, which comprises the error signal $e_0$ as modified by the proportional response of the branch 16, the derivative response of the branch 18 and the integral response of the branch 20, may be applied to any suitable controlling device such as a solenoid proportioning valve (not shown) or the like.

In tracing the error signal $e_0$ through the various branches of the circuit as shown in the drawing, the theory of operation is best understood from the following description utilizing block diagram algebra.

Considering the transient and steady state characteristics for changes in the error signal $e_0$, let the various terms be as follows:

$K_p$ = gain of the amplifier 12
$K_1$ = gain of the amplifier 30
$K_2$ = gain of the amplifier 36
$K_3$ = gain of the amplifier 42
$R_{28}$ = resistance of the resistor 28

$R_{32}$=resistance of the resistor 32
$R_{38}$=resistance of the resistor 38
$R_{40}$=resistance of the resistor 40
$R_{48}$=resistance of the resistor 48
$C_{34}$=capacitance of the capacitor 34
$C_{44}$=capacitance of the capacitor 44 then it follows that the gain factor or transfer function of the circuits 16, 18 and 20 is as follows:

Gain factor of circuit 16 $= -\dfrac{R_{32}}{R_{28}}$

Transfer function of circuit 18 $= -R_{38}C_{34}p$

Transfer function of circuit 20 $= -\dfrac{1}{pR_{40}C_{44}}$ if the gains $K_1$, $K_2$, and $K_3$ are very large or infinity and $p$ is an operator representing $$\frac{d}{dt} \text{ or } jw$$

and $$\frac{1}{p} = \int dt \text{ or } \frac{1}{jw}$$

(where $j=\sqrt{-1}$ and $w$ is angular frequency).

From this, it would be apparent that the ratio of the output signal $E_t$ to the input signal $E_o$ in terms of the $p$ operator is as follows:

$$\frac{E_t}{E_o} = -K_p\left(1+\frac{R_{32}}{R_{28}}+pR_{38}C_{34}+\frac{1}{pR_{40}C_{44}}\right) \quad (1)$$

By algebra, Equation 1 may be written as $$\frac{E_t}{E_o} = -K_p\frac{\left[p^2 R_{40}R_{38}C_{34}C_{44}+p(R_{40}C_{44})\left(\dfrac{R_{32}+R_{28}}{R_{28}}\right)+1\right]}{pR_{40}C_{44}} \quad (2)$$

If we make $R_{32}=R_{38}$ and $R_{28}=R_{40}$ by ganging the variable resistors 32, 38 and 28, 40, as shown by mechanical linkages 54, 56, (in broken lines in the drawing) respectively and by making $C_{34}=C_{44}=C_o$, Equation 2 becomes $$\frac{Et}{E_o} = -K_p\frac{[p^2 R_{38}C_o R_{40}C_o + (R_{40}C_o + R_{38}C_o)p + 1]}{pR_{40}C_o}$$

$$= -K_p\frac{(pR_{38}C_o+1)(pR_{40}C_o+1)}{pR_{40}C_o} \quad (3)$$

Equation 3 is then seen to be the transfer function of the controller when the ganging of the resistors 32, 38 and 28, 40 is made. It should be noted that the three adjustments, namely, mechanical linkages 54, 56 and the gain constant of the amplifier 12 affect the coefficients of Equation 3 without inter-action.

It is common knowledge in the theory of servo mechanisms, that the transfer function of a complete cascade controller is the product of the transfer functions of the individual response circuits. A typical transfer function would be:

$$\frac{E \text{ output}}{E \text{ error}} = \frac{K_p'(pR_1C_1+1)(pR_2C_2+1)}{pR_2C_2} \quad (4)$$

wherein:

$K_p'$=gain factor adjustment of the proportional response circuit
$R_1$=resistance adjustment in the derivative response circuit
$C_1$=capacitance in the derivative response circuit
$R_2$=resistance adjustment in the integral response circuit
$C_2$=capacitance in the integral response circuit It is noted that Equations 3 and 4 are identical in form and from this it will be appreciated that the adjustability and available transfer functions of the cascaded system can be duplicated by the "ganged" parallel system.

In the cascade controller, the coefficients $R_1C_1$ and $R_2C_2$, as illustrated in Equation 4, are always real numbers since resistances and capacitances have real values. In the controller of the present invention with switch 46 in the closed position, the coefficients in the factor forms of the transfer function may be complex numbers. This will be evident when considering the following derivation of the equation for the transfer function of the controller of the present invention with the switch 46 in a closed position.

The transfer function of circuit 20 now becomes $$-\frac{1}{p\left(\dfrac{R_{40}R_{48}}{R_{40}+R_{48}}\right)C_{44}}$$

and the transfer function of the complete system becomes:

$$\frac{E_t}{E_o} = -K_p\left[1+\frac{R_{32}}{R_{28}}+pR_{38}C_{34}+\frac{1}{p\left(\dfrac{R_{40}R_{48}}{R_{40}+R_{48}}\right)C_{44}}\right] \quad (6)$$

By making $C_{34}=C_{44}=C_o$, $R_{28}=R_{32}=R_{38}=R_{40}=R_o$, and $$\frac{R_{40}R_{48}}{R_{40}+R_{48}} = R_e$$

Equation 6 becomes:

$$\frac{E_t}{E_o} = K_p\frac{p^2(R_oC_o R_e C_o)+2pR_eC_o+1}{pR_eC_o} \quad (7)$$

and by extracting the roots of the numerator of Equation 7 we obtain $$p = \frac{1 \pm \sqrt{1-R_o/R_e}}{R_oC_o} \quad (8)$$

Thus, it is seen that the coefficients in the numerator factor of Equation 7 are complex numbers (since $R_o/R_e$ is always greater than unity) which are not available in cascade controllers. In processes which have equivalent inductances and capacitance characteristics, the factored transfer function of the processes may involve complex numbers. By multiplying this function by the factored controller transfer function having complex coefficients it can be readily seen that the complex number factors can be cancelled, thus yielding a simplified overall system transfer function and desirable controlling possibilities.

Another advantage of the parallel component controller of the present invention with the switch 46 in either the closed or opened position is that the control action will be retained even though one of the components 16, 18 or 20 is saturated, that is, when the output ceases to vary for changes in the input thereof. Since the components 16, 18 and 20 are in parallel, the saturation of one of the components will have no effect on the passage of the error signal $e_o$ through the other components. In the cascade controller, the components are in series, therefore, the saturation of one of the components will effect the error signal $e_o$ before reaching the output of the controller itself.

The principle of operation of the present invention may be applied to an electronic, hydraulic or mechanical controller and for purposes of illustration only, the foregoing description of the principle of operation has been applied to an electronic controller. It will be understood that equivalent hydraulic or mechanical components may be utilized for each of the electronic components of the foregoing illustrated embodiment without departing from the present invention.

From the foregoing, it will be apparent that the present invention is adapted for producing all transfer functions available to the conventional cascade controller with identical adjustability. In addition, the present invention provides means for producing factored transfer functions with complex number coefficients and is also immune to saturation of any of the parallel components of the system. It will also be obvious to those skilled in the art that the illustrated embodiment may be variously changed and modified, or features thereof, singly or collectively embodied in other combinations than those illustrated without departing from the scope of the invention or sacrificing any of the advantages thereof, and that accordingly the disclosure herein is illustrative only and the invention is not limited thereto.

It is claimed and desired to secure by Letters Patent:

1. In a device for controlling a process having a controller input adapted to receive a signal indicative of a variable to be controlled and a controller output adapted to be applied to a process, the combination comprising a system including a plurality of parallel components having common inputs, means for impressing said signal upon said inputs, said system including a first component for altering said signal in proportion to changes in the value thereof, a second component for altering the signal in proportion to the integral of the same, and means for impressing the output of each of said components upon said controller output.

2. In a device for controlling a process having a controller input adapted to receive a signal indicative of a variable to be controlled and a controller output adapted to be applied to a process, the combination comprising a system including a plurality of parallel components having common inputs, means for impressing said signal upon said inputs, said system including a first component for altering said signal in proportion to the derivative thereof, a second component for altering the signal in proportion to the integral of the same, and means for impressing the output of each of said components upon said controller output.

3. In a device for controlling a process having a controller input adapted to receive a signal indicative of a variable to be controlled and a controller output adapted to be applied to a process, the combination comprising a system including a plurality of parallel components having common inputs, means for impressing said signal upon said inputs, said system including at least one component for altering said signal in proportion to changes in the value thereof, a second component for altering said signal in proportion to the derivative of the same, a third component for altering said signal in proportion to the integral of the same, and means for impressing the output of each of said components upon said controller output.

4. In a device for controlling a process having a controller input adapted to receive a signal indicative of a variable to be controlled and a controller output adapted to be applied to a process; the combination comprising a system including a plurality of parallel components having common inputs; means for impressing said signal upon said inputs; said system including a first component for altering said signal in proportion to the value thereof, a second component for altering said signal in proportion to the derivative of the same, said first and second components including means for varying the proportion in which said signal is altered in each of said components, means for adjusting said varying means in unison; and means for impressing the output of each of said components upon said controller output.

5. In a device for controlling a process having a controller input adapted to receive a signal indicative of a variable to be controlled and a controller output adapted to be applied to a process; the combination comprising a system including a plurality of parallel components having common inputs; means for impressing said signal upon said inputs; said system including a first component for altering said signal in proportion to the value thereof, a second component for altering said signal in proportion to the integral of the same, said first and second components including means for varying the proportion in which said signal is altered in each of said components, means for adjusting said varying means in unison; and means for impressing the output of each of said components upon said controller output.

6. In a device for controlling a process having a controller input adapted to receive a signal indicative of a variable to be controlled and a controlling output adapted to be applied to a process; the combination comprising a system including a plurality of parallel components having common inputs; means for impressing said signal upon said inputs; said system including a first component for altering said signal in proportion to the value thereof, a second component for altering said signal in proportion to the derivative of the same, and a third component for altering said signal in proportion to the integral of the same, said components including means for varying the proportion in which said signal is altered in each of said components, first means for adjusting said varying means in said first and second components in unison, second means for adjusting said varying means in said first and third components in unison; and means for impressing the output of each of said components upon said controller output.

7. In a device for controlling a process having a controller input adapted to receive a signal indicative of a variable to be controlled and a controller output adapted to be applied to process, the combination comprising a system including a plurality of parallel components having common inputs, means for impressing said signal upon said inputs, said system including a first component for altering said signal in proportion to changes in the value thereof, a second component for altering said signal in proportion to the derivative of the same, a third component for altering said signal in proportion to the integral of the same, means associated with one or more of said components for introducing complex coefficients in the factor form of the transfer function of said device, and means for impressing the output of each of said components upon said controller output.

8. In a device for controlling a process having a controller input adapted to receive a signal indicative of a variable to be controlled and a controller output adapted to be applied to a process, the combination comprising a system including a plurality of parallel components having common inputs, means for impressing said signal upon said inputs, said system including a first component for altering said signal in proportion to changes in the value thereof, a second component for altering said signal in proportion to the derivative of the same, a third component for altering said signal in proportion to the integral of the same, means associated with said third component for altering the transfer function thereof to introduce complex numbers in the factor forms of said transfer function of said device, and means for impressing the output of each of said components upon said controller output.

9. In a device for controlling a process having a controller input adapted to receive a signal indicative of a variable to be controlled and a controller output adapted to be applied to a process, the combination comprising a plurality of parallel components having common inputs, means for impressing the signal upon said inputs, a first of said components producing an output signal having a magnitude proportional to the value of the input signal, a second component producing an output signal having a magnitude proportional to the derivative of the input signal, feed back means operatively connected to each of said first and second components for varying the magnitude of said output signals, means for adjusting said feedback means in unison, and means for impressing said output signals from said components on the controller output.

10. In a device for controlling a process having a controller input adapted to receive a signal indicative of a variable to be controlled and a controller output adapted to be applied to the process, the combination comprising a plurality of parallel components having common inputs, means for impressing the signal upon said inputs, a first of said components producing an output signal having a magnitude proportional to the value of the input signal, a second of said components producing an output signal having a magnitude proportional to the integral of the input signal, restriction means operatively connected to each of said first and second components for varying the magnitude of said output signals, means for adjusting said restriction means in unison, and means for impressing said output signals from said components onto the controller output.

11. In a device for controlling a process having a controller input adapted to receive a signal indicative of a variable to be controlled and a controller output adapted to be applied to a process, the combination comprising a plurality of parallel components having common inputs, means for impressing the signal upon said inputs, a first of said components producing an output signal having a magnitude proportional to the value of the input signal, a second of said components producing an output signal having a magnitude proportional to the derivative of the input signal, a third of said components producing an output signal having a magnitude proportional to the integral of the input signal, feedback means operatively connected to each of said first and second components for varying the magnitude of said output signal, restriction means operatively connected to each of said first and third components for varying the magnitude of said output signal, first means for adjusting said feedback means in unison, second means for adjusting said restriction means in unison, and means for impressing the output signals from said components upon said controller output.

12. In a device for controlling a process having a controller input adapted to receive a signal indicative of a variable to be controlled and a controller output adapted to be applied to the process, the combination comprising a plurality of parallel negative gain amplifiers having common inputs, an additional negative gain amplifier for impressing the signal upon said inputs, a first of said parallel amplifiers producing an output signal having a magnitude proportional to the value of the input signal, a second of said parallel amplifiers producing an output signal having a magnitude proportional to the derivative of the input signal, variable restriction means operatively connected in each of the inputs of said first and second parallel amplifiers for varying the magnitude of said output signals, means for adjusting said variable restriction means in unison, and means for impressing said output signals from said parallel amplifiers on the controller output.

13. In a device for controlling a process having a controller input adapted to receive a signal indicative of a variable to be controlled and a controller output adapted to be applied to the process, the combination comprising a plurality of parallel connected negative gain amplifiers having common inputs, an additional negative gain amplifiers for impressing the signal upon said inputs, a first of said parallel amplifiers producing an output signal having a magnitude proportional to the value of the input signal, a second of said parallel amplifiers producing an output signal having a magnitude proportional to the derivative of the input signal, variable feedback means operatively connected to each of said first and second amplifiers for varying the magnitude of said output signals, means for adjusting said feedback means in unison, and means for impressing said output signals from said parallel amplifiers on the controller output.

14. In a device for controlling a process having a controller input adapted to receive a signal indicative of a variable to be controlled and a controller output adapted to be applied to the process, the combination comprising a plurality of parallel negative gain amplifiers having common inputs, an additional negative gain amplifier for impressing the signal upon said inputs, a first of said parallel amplifiers producing an output signal having a magnitude proportional to the value of the input signal, a second of said parallel amplifiers producing an output signal having a magnitude proportional to the derivative of the input signal, a third of said parallel amplifiers for producing an output signal having a magnitude proportional to the integral of the input signal, variable feedback means operatively connected to each of said first and second parallel amplifiers for varying the magnitude of said output signals, variable restriction means operatively connected in each of the inputs of said first and third parallel amplifiers for varying the magnitude of said output signals, first means for adjusting said feedback means in unison, second means for adjusting said restriction means in unison, and means for impressing said output signals from said parallel amplifiers and said additional amplifier on the controller output.

References Cited in the file of this patent

UNITED STATES PATENTS

| | | |
|---|---|---|
| 2,401,421 | Hahn | June 4, 1946 |
| 2,632,872 | Warsher | Mar. 24, 1953 |
| 2,668,264 | Williams | Feb. 2, 1954 |
| 2,774,928 | Johnson et al. | Dec. 18, 1956 |
| 2,829,329 | Silva | Apr. 1, 1958 |
| 2,849,671 | Stefan | Aug. 26, 1958 |

OTHER REFERENCES

Servomechanism Analysis, Thaler and Brown, McGraw-Hill, 1953, p. 197 and p. 218, Fig. 11–1.